United States Patent [19]

Kimura

[11] Patent Number: 5,418,662
[45] Date of Patent: May 23, 1995

[54] CASSETTE LOADING SYSTEM FOR RECORDING AND REPRODUCING APPARATUS THAT SWITCHES FROM BOTH REELS POWERED TO ONLY ONE REEL POWERED DURING WITHDRAWAL OF TAPE INTO CASSETTE

[75] Inventor: Takashi Kimura, Yokohama, Japan

[73] Assignee: Canon Kabushiki Kaisha, Tokyo, Japan

[21] Appl. No.: 168,236

[22] Filed: Dec. 17, 1993

[30] Foreign Application Priority Data

Dec. 25, 1992 [JP] Japan .................................. 4-358957

[51] Int. Cl.⁶ ............................................. G11B 15/665
[52] U.S. Cl. ..................................... 360/71; 360/74.2; 360/85
[58] Field of Search ................... 360/71, 74.1, 74.2, 360/85; 242/338, 338.3

[56] References Cited

U.S. PATENT DOCUMENTS 5,307,215  4/1994  Inoue et al. ......................... 360/71

FOREIGN PATENT DOCUMENTS 2-33764  2/1990  Japan ................................. 360/74.2

*Primary Examiner*—Aristotelis Psitos
*Assistant Examiner*—James L. Habermehl
*Attorney, Agent, or Firm*—Fitzpatrick, Cella, Harper & Scinto

[57] ABSTRACT

A recording and/or reproducing apparatus draws a recording tape out of a cassette and places the tape around a rotary drum having at least one head to perform recording and/or reproducing. The supply-side and take-up-side reels are rotated to wind the tape for a predetermined amount of time after the initiation of the unloading operation. Then, one of the reels is stopped, and the other reel is continuously rotated to further wind the tape.

16 Claims, 4 Drawing Sheets

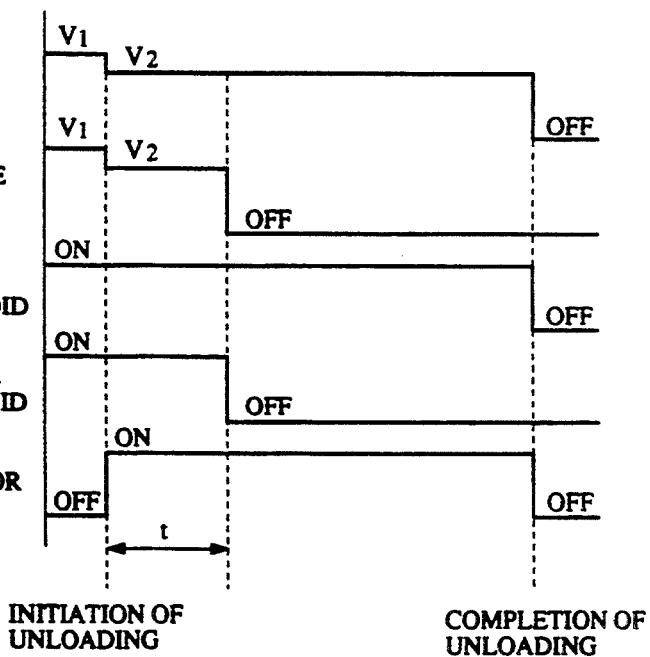

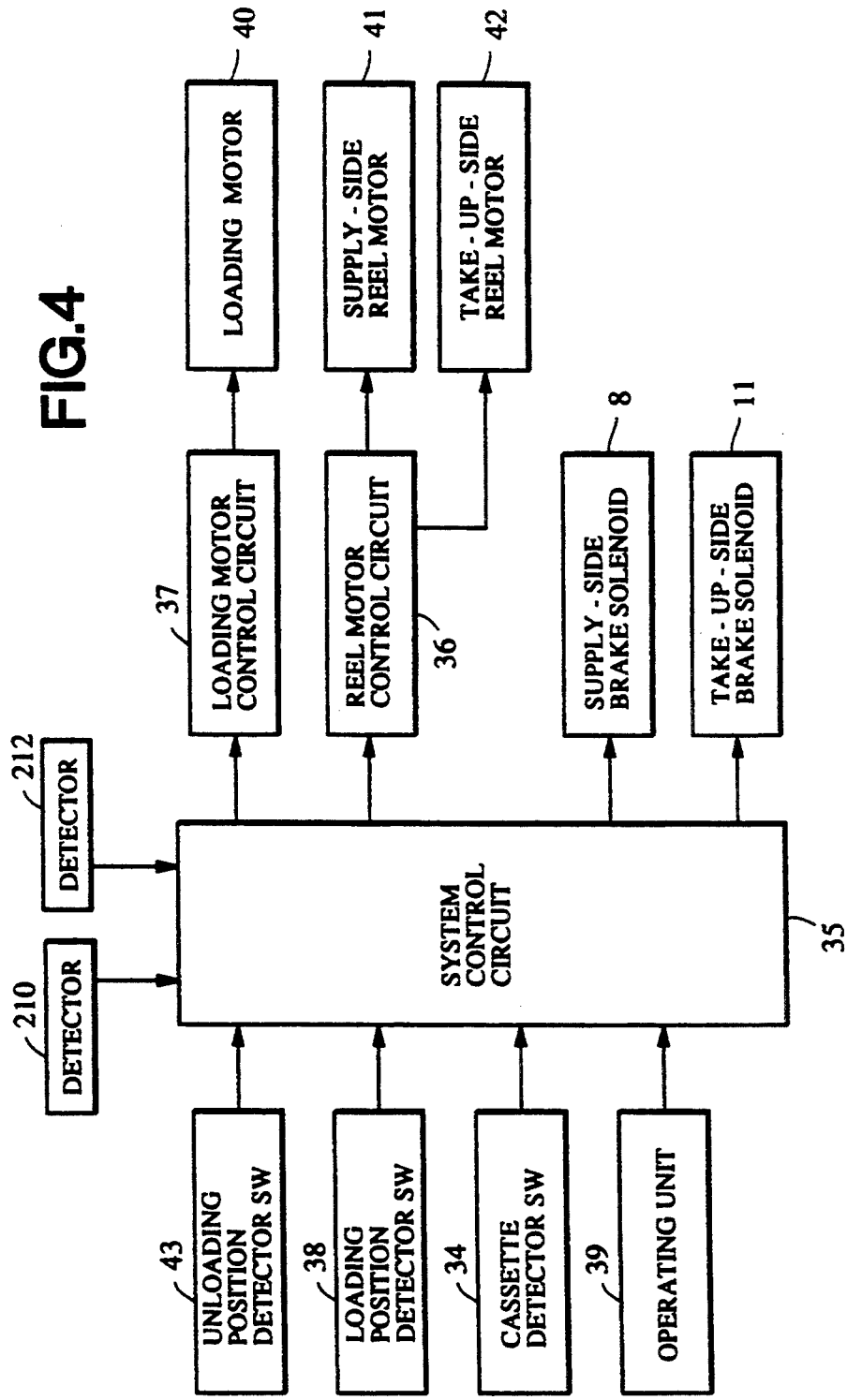

CASSETTE LOADING SYSTEM FOR RECORDING AND REPRODUCING APPARATUS THAT SWITCHES FROM BOTH REELS POWERED TO ONLY ONE REEL POWERED DURING WITHDRAWAL OF TAPE INTO CASSETTE

BACKGROUND OF THE INVENTION

1. Field of the Invention

The present invention relates to a recording and/or reproducing apparatus that performs recording and/or reproducing by placing a recording medium tape around a rotary drum having a head.

2. Description of the Related Art

Many rotary-head magnetic recording and/or reproducing apparatuses, such as video tape recorders (VTRs), employ an M-loading mechanism in which the path of a magnetic tape becomes substantially the shape of a letter "M" when the magnetic tape is drawn out of a tape cassette and placed on the rotary drum.

Such an M-loading type recorder applies a suitable amount of back torque to both the supply-side and take-up-side reels when drawing the tape from both the reels during the loading operation, in order to substantially prevent the tape from being damaged by a flange portion of a post and/or a lead portion of the rotary drum.

When winding the tape into the cassette during the unloading operation, the recorder brakes one of the reels and uses the other reel to wind the tape, in order to substantially prevent the tape from shifting in position even after the loading and unloading operations have been repeated. The winding torque for the reel must be as small as possible in order to protect the tape from being damaged as described above.

However, because the above-described conventional recorder applies a small amount of winding torque to only one of the reels to wind the tape into the cassette during the unloading operation, the recorder is subject to problems as follows. If the reel used for winding the tape has a large tape roll, that is, a tape roll having a large diameter, such a small winding torque is likely to fail to rotate the reel quickly when the unloading operation is started, that is, when the tape drawing posts start shifting. If the rotation of the reel to wind the tape is delayed or slowed in such an occasion, the tape slackens and falls off from the posts and, therefore, may be damaged.

SUMMARY OF THE INVENTION

Accordingly, an object of the present invention is to provide a recording and/or reproducing apparatus having a simple mechanism for substantially preventing a recording medium tape from slackening during the unloading operation.

According to the present invention, an apparatus for recording information on a tape-like recording medium wound on a pair of reels and/or reproducing the information recorded on the recording medium, comprises: at least one head for recording and/or reproducing information onto and/or from the recording medium, the at least one head being provided in a rotary drum; loading means for positioning the recording medium around the rotary drum and releasing the recording medium from the rotary drum; a pair of reel tables for interconnecting with and rotating the pair of reels, respectively; and control means for, when the loading means releases the recording medium from the rotary drum, immediately rotating the pair of reel tables in such a manner that the recording medium is wound on the pair of reels, and continuing rotating the pair of reel tables for a predetermined amount of time, and then discontinuing rotating a first reel of the pair of reel tables while continuing rotating the second reel of the pair of reel tables.

The recording and/or reproducing apparatus of the present invention uses both the reels to wind a tape-like recording medium for a predetermined amount of time after the initiation of the unloading operation, thereby preventing the tape from slackening.

Further objects, features and advantages of the present invention will become apparent from the following description of the preferred embodiments with reference to the attached drawings.

BRIEF DESCRIPTION OF THE DRAWINGS

FIG. 3 (comprising FIGS. 3(a), 3(b), 3(c), 3(d) & 3(e) is a timing chart during the unloading operation of a VTR according to the embodiment of the invention.

FIG. 4 is a circuit block diagram of a control system of reel motors, brake solenoids and a loading motor used in the embodiment.

DESCRIPTION OF THE PREFERRED EMBODIMENTS

A video tape recorder according to a preferred embodiment of the present invention will be described hereinafter with reference to the drawings.

Figure 1:
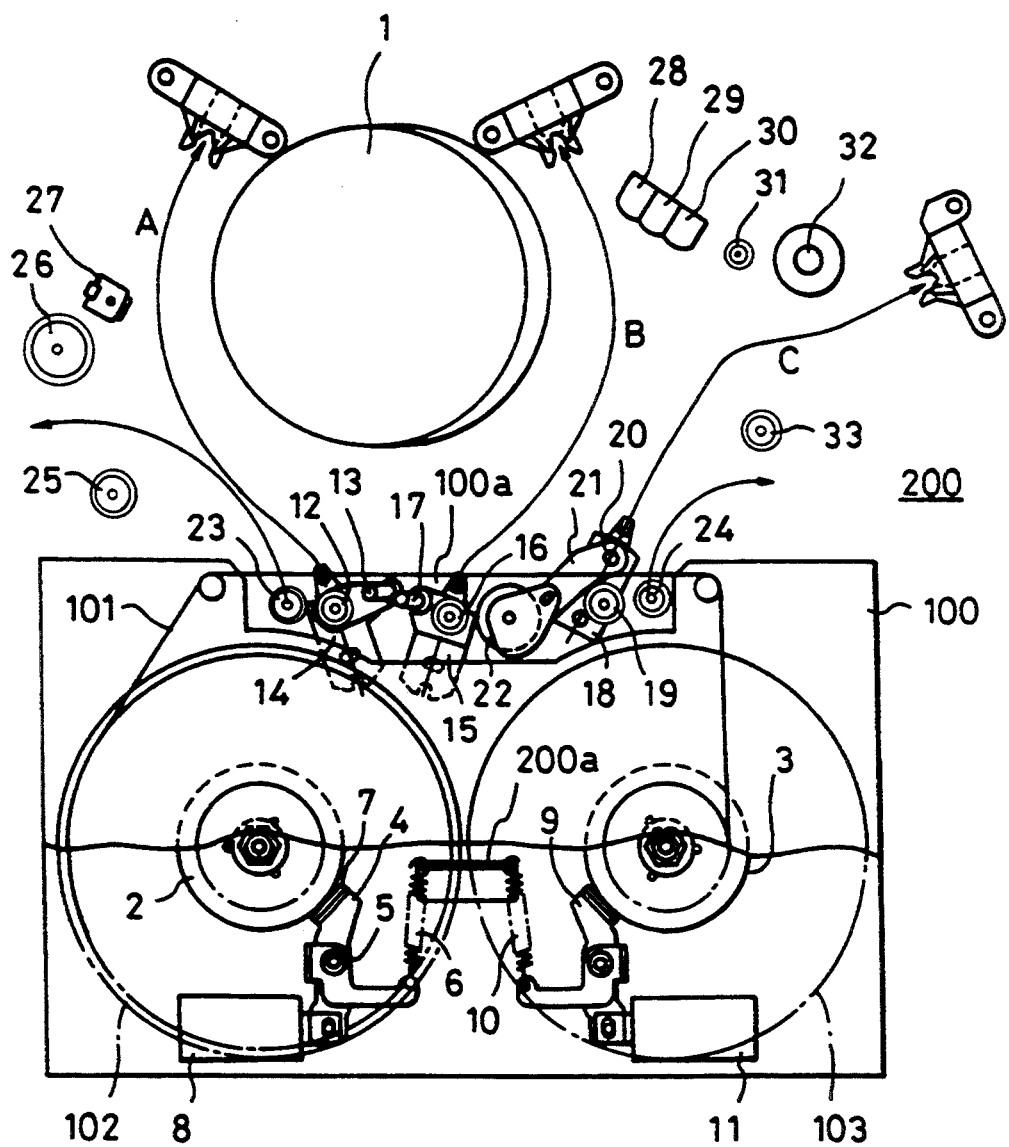
FIG. 1 is a plan view of essential portions including reels and posts of an embodiment of the present invention, illustrating the positions thereof before the loading operation.
Figure 2:
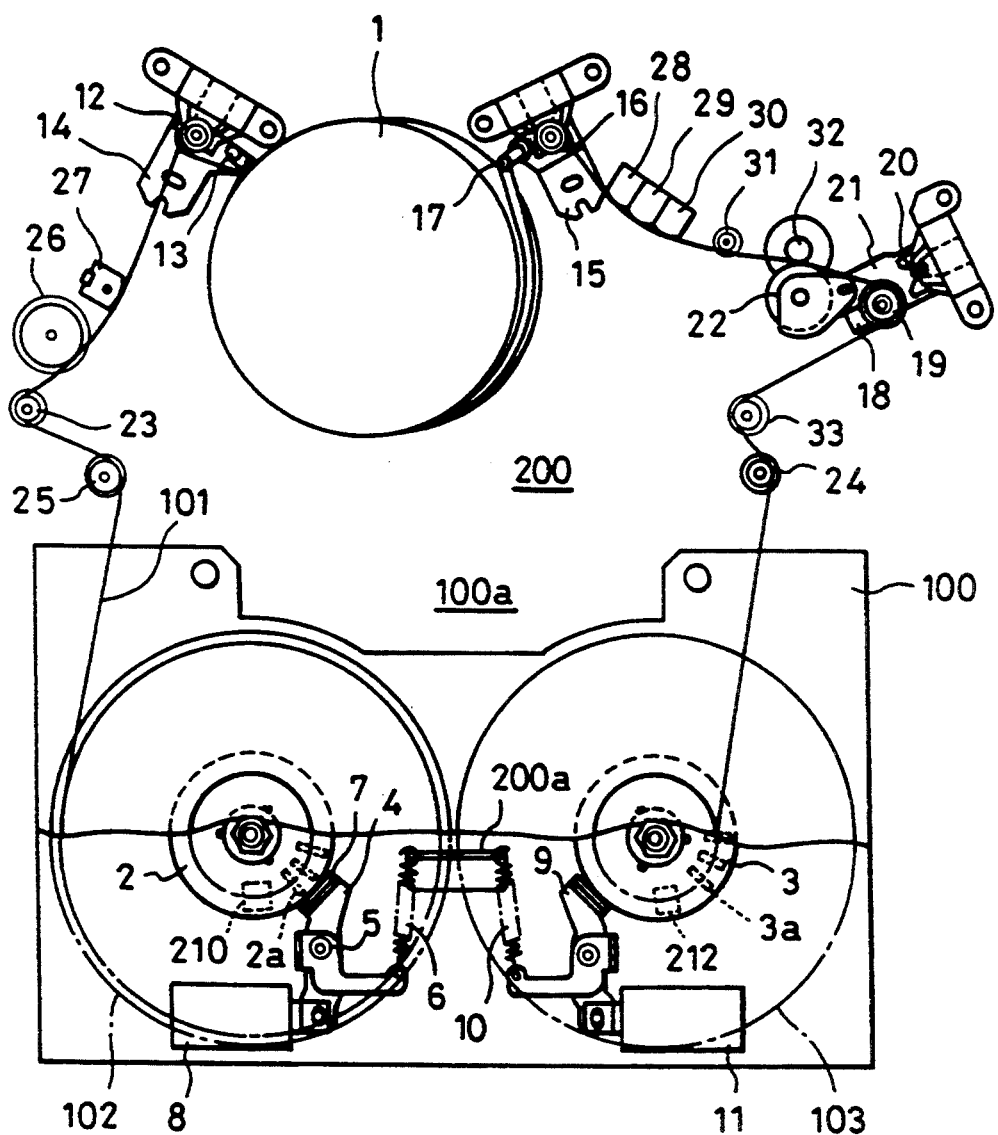
FIG. 2 is a plan view of essential portions substantially the same as shown in FIG. 1 when the loading operation is completed.

As shown in FIGS. 1 and 2, the VTR employs a parallel M-loading mechanism in which a magnetic tape is set substantially in the axial symmetry about a rotary drum.

A tape cassette 100 comprises a supply-side reel 102, a take-up-side reel 103 and a magnetic tape 101 wound thereon.

A rotary drum 1 has a magnetic head. A supply-side reel table 2 and a take-up-side reel table 3 are provided for connecting to the supply-side reel 102 and the take-up-side reel 103, respectively.

The supply-side reel table 2 is provided with a supply-side table brake arm 4 which is rotatably supported by a shaft 5 and urged toward the supply-side reel table 2 by a spring 6. The brake arm 4 has a brake pad 7 adhered to an end portion thereof that contacts the reel table 2. The brake arm 4 is connected at another end thereof to a supply-side reel brake solenoid 8 which linearly operates so as to control the braking operation of the brake arm 4.

The take-up-side reel table 3 is provided with a take-up-side reel brake arm 9 which, similar to the brake arm 4, is urged toward the take-up-side reel table 3 by a spring 10. The brake arm 9 is connected at one end thereof to a take-up-side brake solenoid 11.

The other ends of the springs 6, 10 are connected to a stopper portion 200a which has been formed by cutting and bending a frame 200 of the recorder. The reel tables 2, 3 are rotated by reel motors (not shown) provided below the reel tables 2, 3, respectively.

An inlet perpendicular post 12 and an inlet inclined post 13 are provided on a slider 14. An outlet perpendicular post 16 and an outlet inclined post 17 are provided on a slider 15. A perpendicular post 19 and a shaft 20 are provided on a slider 18. A pinch roller arm 21 is rotatably fitted over the shaft 20. The pinch roller arm 21 is connected at one end thereof to pinch roller 22 which is rotatable. A tension control post 23 and a perpendicular post 24 are also provided. All of these posts are positioned in an opening portion 100a of the cassette 100 when the cassette 100 is loaded in the recorder.

In addition to the posts, the frame 200 is provided with the following members: a perpendicular post 25; an impedance roller 26; an entire-width erasing head 27; a set of heads comprising an erasing head 28, a recording-/reproducing head 29 and a monitor head 30 for erasing, recording, reproducing, monitoring signals of audio, CTL and time codes, respectively; a perpendicular post 31; a capstan 32; and a perpendicular post 33. These members form a tape path.

Next described will be the operation for loading and the operation for unloading, which is a main feature of the present invention. FIG. 3 is a timing chart of the unloading operation. FIG. 4 is a circuit block diagram of a control system for the reel motors, the brake solenoids 8, 11 and a loading motor.

The loading operation will be first described with reference to FIGS. 1 and 4. When the cassette 100 is loaded in the recorder and a cassette detector SW 34 detects the cassette 100, a system control circuit 35 instructs a reel motor control circuit 36 to rotate a supply-side reel motor 41 so as to wind up the tape and, simultaneously, supplies electricity to the supply-side brake solenoid 8 so that the brake arm 4 turns clockwise despite the restoration force of the spring 6, thus releasing the brake pad 7 from the supply-side reel table 2. This operation is continued for a certain amount of time so that the supply-side reel 102 tightly winds the tape 101.

Then, the system control circuit 35 instructs a loading motor control circuit 37 to supply electricity to a loading motor 40 so that the sliders 14, 15 and 18 move along guide rails (not shown) in the directions indicated by arrows A, B and C, thus drawing the tape 101 out of the cassette 100. When the sliders 14, 15 and 18 are moved to final positions, the loading position detector SW 38 is turned on, thus completing the loading operation.

The unloading operation will now be described with reference to FIGS. 2, 3 and 4. When an eject button provided for an operating unit 39 is pressed, the system control circuit 35 instructs the loading motor control circuit 37 to supply electricity to the loading motor 40 so that the sliders 14, 15 and 18 and the posts inside the tape path start to move toward the home positions for unloading and, simultaneously, instructs the reel motor control circuit 36 to change the voltage supplied to the supply-side and take-up-side reel motors 41, 42 from the tape-running voltage level $V_1$ to the unloading voltage level $V_2$ so that the supply-side and take-up-side reels 102, 103 rotate to wind the tape 101. During the unloading operation, detectors 210, 212 provided on the frame 200 count patterns of regularly-spaces indicia 2a, 3a provided on the bottom surfaces of the reel tables 2, 3, thus monitoring the amounts of tape wound on the reels 102, 103, respectively. Although not exactly shown in FIG. 2, the patterns of indicia 2a, 3a are provided all around the reel tables 2, 3 at regular intervals. The outputs of the detectors 210, 212 are inputted to an arithmetic unit in the system control circuit 35. Although the detectors 210, 212 are photosensitive in this embodiment, magneto-sensitive detectors, such as Hall elements, may instead be used provided that the patterns of indicia 2a, 3a are magnetic patterns.

Thus, because the VTR uses both the supply-side and take-up-side reels 102, 103 to wind the tape 101 when the unloading operation is started, it prevents the tape from slackening when the posts start moving back to the home positions, regardless of the diameters of the tape rolls on the reels 102, 103.

After a predetermined amount of time t, the electricity supplied to the take-up-side reel motor 42 and the take-up-side brake solenoid 11 are simultaneously discontinued. Thus, the take-up-side reel table 3 is braked, and only the supply-side reel 102 continues to wind the tape 101.

The amount of the tape 101 thus wound on the reel 103 by the take-up-side reel table 3 is calculated by the arithmetic unit in the system control circuit 35, based on the outputs from the detector 212. With reference to this data, the tape 101 can be put back to the same position when the tape 101 is loaded again, thereby enabling the VTR to reproduce the same image that has been last reproduced from the tape 101.

During the unloading operation, when all the posts and the like are moved back to the respective home positions as indicated in FIG. 1, the unloading position detector SW 43 is turned on. Then, the electricity supplied to the loading motor 40, the supply-side reel motor 41, and the supply-side brake solenoid 11 is discontinued, thus completing the unloading operation. After that, the cassette 100 will be ejected.

If the loading operation is started when the unloading operation has been completed, the take-up-side reel table 3 is braked until the loading operation is completed. Then, the tape 101 is unwound from the take-up-side reel 103 and wound on the supply-side reel 102 in accordance with the wound tape amount calculated by the arithmetic unit. Thus, the tape 101 can be put back to the same position, as described above.

If the unloading operation is started during the loading operation, both the supply-side and take-up-side reel tables 2, 3 are also operated to wind the tape 101 for a certain amount of time after the initiation of the unloading operation.

Because the above-described embodiment operates both the supply-side and take-up-side reel motors to wind the tape onto the supply-side and take-up-side reels for a certain amount of time after the initiation of the loading operation, the embodiment unfailingly winds the tape into the cassette and prevents the tape from slackening when the guide posts and the like start moving, regardless of the diameters of the tape rolls on the reels. Thus, the recording and/or reproducing apparatus of the invention protects the tape from damage and achieves smooth unloading operation.

Furthermore, because both the supply-side and take-up-side reel tables need to be operated to wind a tape only when the guide posts and the like start moving, that is, because the amount of time while both the tables are operated to wind a tape is a considerably short time, the positional shift of the tape caused by the unloading operation can be limited to a small amount.

The individual components shown in outline or designated by blocks in the drawings are all well-known in the recording and reproducing arts, and their specific construction and operation are not critical to the operation or best mode for carrying out the invention.

While the present invention has been described with reference to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus for performing at least one of recording information on a tape-like recording medium wound on a pair of reels and reproducing the information recorded on the recording medium, said apparatus comprising:
    at least one head for performing at least one of recording information onto the recording medium and reproducing information from the recording medium, said at least one head being provided in a rotary drum;
    loading means for positioning the recording medium around said rotary drum and releasing the recording medium from said rotary drum;
    a pair of reel tables for interconnecting with and rotating the pair of reels, respectively; and
    control means for, when said loading means releases the recording medium from said rotary drum, immediately rotating said pair of reel tables in such a manner that the recording medium is wound on the pair of reels, and continuing rotating said pair of reel tables for a predetermined amount of time, and then discontinuing rotating a first reel table of said pair of reel tables while continuing rotating a second reel table of said pair of reel tables.

2. An apparatus according to claim 1, further comprising brake means for braking said pair of reel tables.

3. An apparatus according to claim 2, wherein said control means operates said brake means against said first reel table to effect discontinuing rotating said first reel table.

4. An apparatus according to claim 1, further comprising detector means for detecting a rotational status of said pair of reel tables.

5. An apparatus according to claim 4, wherein said detector means detects patterns provided on said pair of reel tables, each pattern comprising indicia provided at regular intervals.

6. An apparatus according to claim 5, wherein said control means calculates an amount of the recording medium wound on the pair of reels on the basis of the number of indicia detected by said detector means.

7. An apparatus according to claim 6, wherein said control means controls the operation of said pair of reel tables so that the recording medium is drawn out from the reel connected to said second reel table when said loading means positions the recording medium around said rotary drum a second time, and said control means controls the operation of said pair of reel tables so that a portion of the recording medium wound on the reel connected to said first reel table is conveyed toward the reel connected to said second reel table, when the recording medium has been positioned around said rotary drum.

8. An apparatus according to claim 1, wherein said pair of reel tables are rotated by separate motors.

9. An apparatus for positioning a tape wound on a pair of reels around a rotary drum, said apparatus comprising:
    loading means for positioning the tape around the rotary drum and releasing the tape from the rotary drum;
    a pair of reel tables for interconnecting with and rotating the pair of reels, respectively; and
    control means for, when said loading means releases the tape from the rotary drum, immediately rotating said pair of reel tables in such a manner that the tape is wound on the pair of reels, and continuing rotating said pair of reel tables for a predetermined amount of time, and then discontinuing rotating a first reel table of said pair of reel tables while continuing rotating a second reel table of said pair of reel tables.

10. An apparatus according to claim 9, further comprising brake means for braking said pair of reel tables.

11. An apparatus according to claim 10, wherein said control means operates said brake means against said first reel table to effect discontinuing rotating said first reel table.

12. An apparatus according to claim 9, further comprising detector means for detecting a rotational status of said pair of reel tables.

13. An apparatus according to claim 12, wherein said detector means detects patterns provided on said pair of reel tables, each pattern comprising indicia provided at regular intervals.

14. An apparatus according to claim 13, wherein said control means calculates an amount of the tape wound on the pair of reels on the basis of the number of indicia detected by said detector means.

15. An apparatus according to claim 14, wherein said control means controls the operation of said pair of reel tables so that the tape is drawn out from the reel connected to said second reel table when said loading means positions the tape around said rotary drum a second time, and said control means controls the operation of said pair of reel tables so that a portion of the tape wound on the reel connected to said first reel table is conveyed toward the reel connected to said second reel table, when the tape has been positioned around said rotary drum.

16. An apparatus according to claim 9, wherein said pair of reel tables are rotated by separate motors.

* * * * *

UNITED STATES PATENT AND TRADEMARK OFFICE
CERTIFICATE OF CORRECTION

PATENT NO. : 5,418,662

DATED : May 23, 1995

INVENTOR(S) : TAKASHI KIMURA

It is certified that error appears in the above-indentified patent and that said Letters Patent is hereby corrected as shown below:

COLUMN 2

Line 26, "3(e)" should read --3(e),--.

COLUMN 3

Line 63, "regularly-spaces" should read --regularly-spaced--.

Signed and Sealed this

Seventeenth Day of October, 1995

Attest:

BRUCE LEHMAN

Attesting Officer       Commissioner of Patents and Trademarks